March 14, 1933. B. P. JOHNSON 1,901,299
MULCHING WHEEL FOR SEEDING MACHINES
Original Filed Feb. 6, 1932
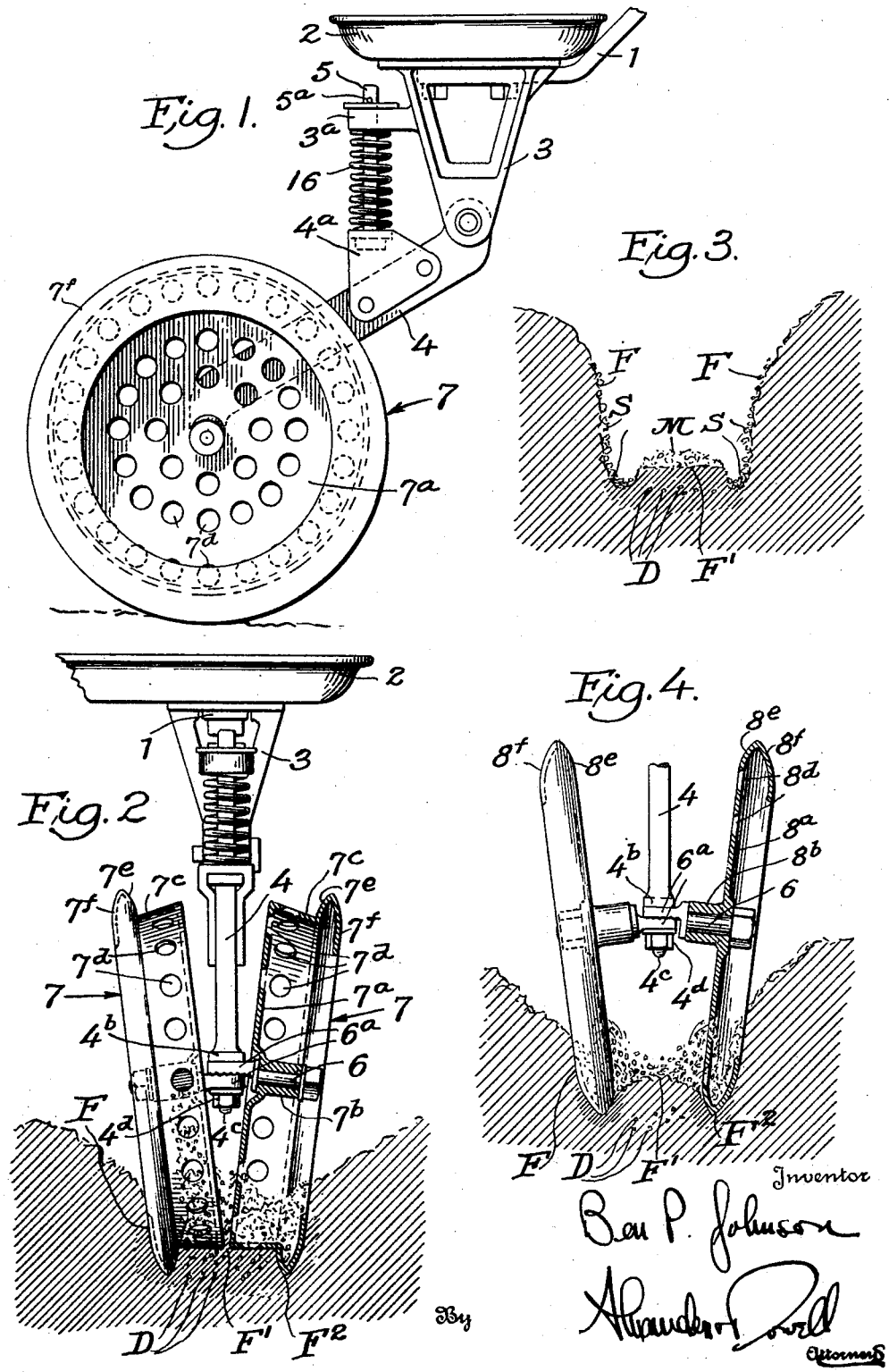

Patented Mar. 14, 1933

1,901,299

UNITED STATES PATENT OFFICE

BEN P. JOHNSON, OF SPRINGFIELD, OHIO, ASSIGNOR TO EDWARD E. GREINER, OF SPRINGFIELD, OHIO

MULCHING WHEEL FOR SEEDING MACHINES

Original application filed February 6, 1932, Serial No. 591,407. Divided and this application filed February 6, 1932. Serial No. 591,408.

This invention is a novel improvement in adjustable press and mulching wheels for seeding machines, the present application being a division of my copending application, Serial No. 591,407, filed February 6, 1932.

The principal object of the invention is to provide novel mulching wheels, of the closed and open type, adapted to operate in the furrows seeded by the seeding machine for the purpose of spreading loose soil over the seeded portion of the furrow to conserve moisture over the planted seed.

Other objects of the invention are to provide novel mulching wheels used in sets consisting of two wheels disposed at an angle to each other, toed in at the bottom, the wheels of the closed type each having an annular portion at their inner edges adapted to press the dirt down in the furrow over the planted seed, the wheels having at their outer edges half-round projecting rims adapted to form trenches at the sides of the furrow for retaining the loose soil that falls in from the sides of the furrow, thereby preventing an excessive amount of soil from being deposited over the seed; and the half round projection picking up dirt from the sides of the furrow, the dirt being discharged through perforations in the flat tire and inner wall of the wheel to form a loose or unpacked moisture retaining mulch over the soil that has been pressed down over the seeds.

A further object is to provide novel open mulching wheels in which the annular portions of the wheels are omitted, whereby the wheels will not press the soil down upon the seed sown in the furrows.

I will explain the invention with reference to the accompanying drawing which illustrates several practical embodiments thereof to enable others familiar with the art to adopt and use the same, and will summarize in the claims the novel features of construction and novel combination of patents for which protection is desired.

In said drawing:

Fig. 1 is a side elevation of my novel closed type press and mulching wheels showing a portion of the arms for attaching same to the rear end of a seeding machine.

Fig. 2 is a rear elevation thereof, showing the wheels operating in the seeded furrow, one of the wheels being in section.

Fig. 3 is a section through a furrow formed by my closed type press and mulching wheels shown in Fig. 2.

Fig. 4 is a view similar to Fig. 2 showing my open type press wheels operating in the seeded furrow.

My novel press wheels are adapted to be hingedly attached to the rear of a seeding machine of any type, though preferably of the type shown in my aforesaid application, the wheels being in alignment with the furrow openers carried by the machine in the usual manner. The attachment of the wheels to the seeding machine may consist of a pan 2 hingedly connected by straps 1 to the rear end of the seeding machine frame, said pan 2 having a bracket 3 mounted on its underside, to the lower end of which is pivotally secured an arm 4 which carries the set of mulching wheels. The pan 2 is adapted to receive weights such as rocks or the like to hold the press wheels down to the ground with any desired pressure. The bracket 3 is provided with a projecting lug 3a and the arm 4 with a bracket 4a, and a bolt 5 extends through the bracket and lug around which is interposed a spring 16 for the purpose of yieldingly pressing the arm 4 downwardly into the furrow. A pin 5a in the upper end of bolt 5 limits the downward movement of the arm 4, while the spring 6 yieldably depresses the mulch wheels into the furrow F.

The outer end of the arm 4 is provided with a shoulder 4b beyond which extends a threaded projection 4c upon which the serrated and flattened heads 6a of the stub axles 6 of the wheels 7 are mounted, the opposed stub axles 6 being clamped to the end of arm 4 by means of a bolt 4d. The heads 6a of the stub axles 6 are disposed at a slight angle to the axis of the stub shafts, whereby when the axles are bolted to the member 4 the axes thereof will be inclined slightly downwardly as shown in Figs. 2 and 4 so that the press wheels will be toed in at the bottom so as to lie closely adjacent at the ground level with their inner peripheries nearly touching, as shown in Fig. 2. The serrated heads 6a permit adjustment of the axles and wheels of the set about a vertical axis, i. e., relative to the ground.

As shown in Figs. 1 and 2, my novel closed type press wheels each comprise a plate 7a at the inner periphery of the wheels, said plate carrying a hub 7b for its stub axle 6, which hub extends outwardly from the plate 7a as shown. Plate 7a is provided at its periphery with an outwardly extending peripheral flange 7c disposed substantially at right angles to the plate 7a, said flange extending outwardly from plate 7a a distance sufficient to cover substantially half of the seeded portion F' of the furrow. Beyond flange 7c is an outwardly flaring or rounding flange 7e and beyond flange 7e is an inwardly rounding flange 7f, the flanges 7e and 7f together forming a substantially half round peripheral flange on the rim of annular flange 7c, but of greater diameter thereof for the purpose hereinafter set forth. As shown, the half round flanges 7e, 7f, are about half the width of the flange 7c, but the proportions may vary to suit requirements. The plate 7a and the flange 7c are provided with a series of perforations 7d as shown for the purpose hereinafter set forth.

When pressure is applied on the closed type press wheels shown in Fig. 2, the flanges 7e, 7f forming the substantially half round projection, will make indentations F2 at the sides of the furrow F, beyond the central portion F' where the seeds D have been already deposited by the seeding machine as disclosed in my aforesaid application. As the two wheels 7 are toed in and nearly meet at the ground level the soil at the central portion F' will be pressed substantially flat by the opposed flanges 7c over the seed as shown. The outer half round flange 7e, 7f forms the grooves F2 adapted to retain the loose soil S (Fig. 3) which rolls down the sides of the furrow F preventing too much soil being deposited upon the raised central portion F' containing the seed. Both wheels 7 are adjustable by means of the serrated heads 6a of their stub axles 6 and can be spread apart at the rear ends thereof, and when so adjusted the outer half round flange 7e, 7f will pick up the loose fine soil S from the sides of the furrow F and when the wheels are in motion this loose soil S carried in the wheels as shown in Fig. 2 will be moved inwardly of the wheels and will be discharged through the perforations 7d in the annular flange 7c and in the plate 7a, the soil S passing out rearwardly through the perforations and falling as a dry soil mulch M (Fig. 3) upon the pressed central portion F' in which the seeds D have been planted. The object of the loose soil mulch M is to retain moisture in the pressed soil F' over the seed.

The open press wheels shown in Fig. 4 are of somewhat similar design to that of the closed wheels, except that the wheels have no inner annular pressing flange corresponding with the flange 7c in Fig. 2, and hence these wheels, as shown in Fig. 4, do not press the soil in the central portion F' over the seed D, although they form the trenches F2 at the outer edges of the furrow F. These open type press wheels each comprise a plate 8a carrying the hub 8b for the stub shaft 6, the plates 8a having a peripheral flange 8e corresponding with flanges 7e in Fig. 2, and a flange 8f corresponding with flange 7f in Fig. 2, and the disk 8a is perforated as at 8d for permitting the fine soil S inside the wheel to pass through the seed openings in the plate 8a.

In both types of wheels the angularity of the wheels of each set may be adjusted by loosening the nut 4d so as to adjust the angularity thereof with respect to the axis of the furrow to cause a more or less quantity of dirt to be spread in the form of a loose mulch over the seeded portion F' of the furrow.

I claim:

1. A mulching device for operating in a seed furrow, comprising a wheel closed at one side and open at its other side, means as the wheel is rolling for collecting soil from the furrow through the open side of the wheel, and means as the wheel is rolling for discharging the soil in the form of a loose mulch through the closed side of the wheel.

2. In a device as set forth in claim 1, the soil collecting means comprising an annular flange of substantially half round cross-section at the open side of the wheel of larger diameter than the major portion of the periphery of the wheel.

3. In a device as set forth in claim 1, the periphery of the wheel adjacent the closed side being substantially flat, and the periphery of the wheel adjacent the open side being of substantially half rounded cross-section and of larger diameter than the flat portion.

4. A mulching device for operating in a seed furrow, comprising a wheel of substantially half the width of the furrow, said wheel being closed at its inner side and open at its outer side, means as the wheel is rolling for collecting soil from the side walls of the furrow through the open side of the wheel, and means as the wheel is rolling for discharging the soil in the form of a loose mulch through the closed side of the wheel.

5. In a wheel as set forth in claim 4, the soil collecting means comprising an annular flange of substantially half round cross-section at the open side of the wheel, said flange being of larger diameter than the major portion of the periphery of the wheel.

6. In a device as set forth in claim 4, the periphery of the wheel adjacent the closed side being substantially flat, and the periphery of the wheel adjacent the open side being of substantially half rounded cross-section and of larger diameter than the flat portion.

7. In a mulch wheel as set forth in claim 4, an annular perforated pressing surface on the periphery of the wheel adjacent the closed side thereof adapted to compact the soil adjacent the center of the furrow, the mulch discharging through the perforations upon the compacted soil.

8. A mulching device for operating in a seed furrow, comprising a pair of opposed wheels, each wheel being closed at its inner side and open at its outer side, means as the wheels are rolling for collecting soil from the side walls of the furrow through the open sides of the wheels, means as the wheels are rolling for discharging the soil in the form of a loose mulch through the closed sides of the wheels, and means for adjusting the angularity of the wheels about a vertical axis with respect to the axis of the furrow.

9. In a device as set forth in claim 8, the soil collecting means comprising an annular flange of substantially half round cross-section at the open side of each wheel of larger diameter than the major portion of the periphery of the wheel.

10. In a device as set forth in claim 8, the periphery of the wheel adjacent the closed side being substantially flat, and the periphery of the wheel adjacent the open side being of substantially half round cross-section and of larger diameter than the flat portion.

11. In a device as set forth in claim 8, an annular perforated pressing surface on the periphery of the wheel adjacent the closed side thereof adapted to compact the soil adjacent the center of the furrow, the mulch discharging through the perforations upon the compacted soil.

12. A mulching device for seeding machines and the like, comprising a link pivotally mounted on the machine, a pair of opposed press wheels carried by the link and operating in the seed furrow, each wheel comprising a disk forming the inner side wall of the wheel, a hub carried by the disk, an out-turned annular flange at the periphery of the disk adapted to compact the soil at the central portion of the furrow, and a substantially half round flange at the outer periphery of and of larger diameter than the out-turned flange adapted to collect dirt from the side walls of the furrow, the out-turned flange being perforated to discharge the soil in the wheel in the form of a loose mulch over the compacted central portion.

13. In a mulching device as set forth in claim 12, each wheel operating in half the width of the furrow, and means for adjusting the angularity of the wheels relative to the ground.

BEN P. JOHNSON.